W. HEATH.
Safety Rein-Holders.
No. 155,651. Patented Oct. 6, 1874.
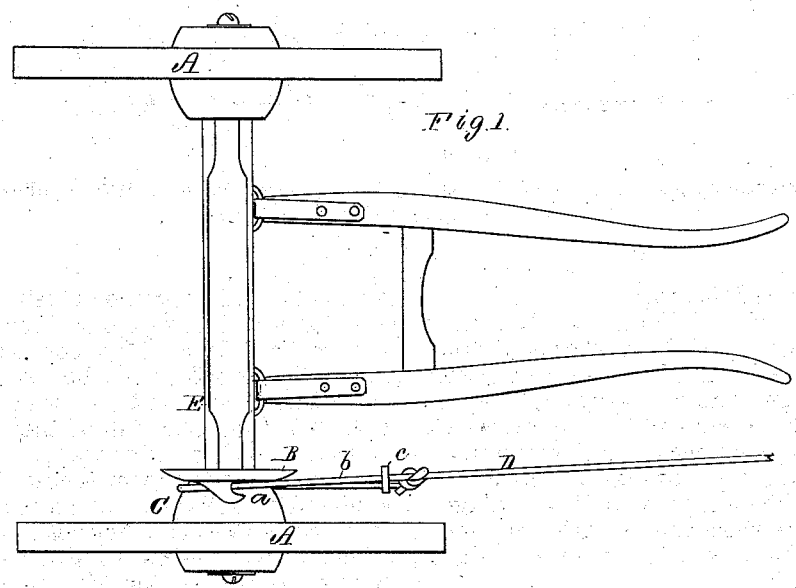
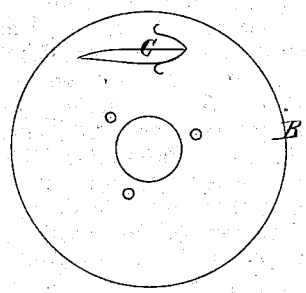
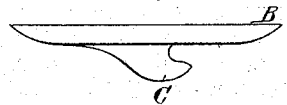
Witnesses
S. N. Piper
L. N. Miller
William Heath
by his attorney
R. H. Eddy

UNITED STATES PATENT OFFICE.

WILLIAM HEATH, OF BATH, MAINE.

IMPROVEMENT IN SAFETY REIN-HOLDERS.

Specification forming part of Letters Patent No. 155,651, dated October 6, 1874; application filed August 19, 1874.

*To all whom it may concern:*

Be it known that I, WILLIAM HEATH, of Bath, of the county of Sagadahoc and State of Maine, have invented a new and useful Wheel-Carriage Safety Apparatus; and do hereby declare the same to be fully described in the following specification and represented in the accompanying drawings, of which—

Figure 1 denotes a top view of it, as arranged with a carriage-wheel and its axle, provided with thills. Fig. 2 is a top view, and Fig. 3 a side view, of it.

The object of said invention or apparatus is to check or stop a horse in an attempt to run away with a carriage to which he may be attached, the apparatus allowing the horse to move the carriage backward to any extent.

I am aware that it has been customary to tie a rope or rein to one of the wheels of a carriage and to the bit of the harness, in order that in case the horse, while left by himself, should make an attempt to start forward with the vehicle the wheel, by revolving, would pull on the rein and check him. This plan of proceeding is attended with great danger, for should the animal move backward instead of forward the tendency would be to cause him to still further move backward, in which case he might injure himself or the carriage. With my apparatus applied to a vehicle the horse may move backward without danger of being drawn back by the check line or rein. He cannot, however, move forward but a short distance without being completely checked.

In carrying out my invention I fix to the inner end of the hub *a* of one of the wheels A A a convex disk, B, provided with a hook, C, formed and projecting from it in manner substantially as represented, the disk being concentric with the hub, and having the wheel-journal extended through both. With the said hooked disk I employ a rein or line, D, provided with a loop, *b*, in which there may be placed a slide, *c*. This loop is either to be around the axle E or the hub of the wheel, and is also to be buckled, hitched, or fastened to the bit of the headstall of the horse when he is harnessed to the carriage.

Under ordinary circumstances the loop is to be placed on the axle, and may be kept there by means of the slide; but when it may be desirable to have the horse stand or with the carriage be restive, the loop should be cast over the disk and upon the part of the hub between it and the spokes of the wheel. Should the animal become restless and attempt to run away with the vehicle, the hook, as the wheel may revolve, will catch upon the check rein or line and cause it to be wound around the hub, so as to soon check the horse. In case he may move back the hook will continue to revolve with the wheel without winding the rein on the hub.

I do not claim, in combination with the wheel of a carriage, a hitching apparatus composed in whole or in part of a windlass ratchet-wheel, driving-pinion, pawl, and shaft, arranged and applied as represented in the United States Patent No. 63,344, and to operate so that the winding up or shortening of the reins shall take place only during the forward movement of the wheel. My improvement is simpler and very efficient.

I claim—

The disk B, the hook C, and the loop *b*, in combination with the wheel-hub *a* and the check-rein D, substantially in the manner and for the purpose specified.

WILLIAM HEATH.

Witnesses:
S. T. WOODWARD, Jr.,
THOMAS LEONARD.